United States Patent
Ragaly

[11] Patent Number: 6,144,138
[45] Date of Patent: *Nov. 7, 2000

[54] CLAW POLE GENERATOR

[75] Inventor: Istvan Ragaly, Schwieberdingen, Germany

[73] Assignee: Robert Bosch GmbH, Stuttgart, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/944,116

[22] Filed: Oct. 6, 1997

[30] Foreign Application Priority Data

Oct. 17, 1996 [DE] Germany .......................... 196 42 784

[51] Int. Cl.$^7$ .................................................. H02K 1/22
[52] U.S. Cl. .......................... 310/263; 310/257; 310/91
[58] Field of Search .......................... 310/263, 91, 67 R, 310/156, 216, 181, 218, 257; 29/596, 597, 598

[56] References Cited

U.S. PATENT DOCUMENTS

| | | | |
|---|---|---|---|
| 4,179,634 | 12/1979 | Burson | 310/153 |
| 4,769,624 | 9/1988 | Merritt et al. | 335/302 |
| 5,010,722 | 4/1991 | Yamaguchi et al. | 57/124 |
| 5,015,901 | 5/1991 | Phelon et al. | 310/153 |
| 5,038,065 | 8/1991 | Matsubayashi et al. | 310/162 |
| 5,289,072 | 2/1994 | Lange | 310/266 |
| 5,483,116 | 1/1996 | Kusase et al. | 310/263 |
| 5,543,676 | 8/1996 | York et al. | 310/263 |
| 5,552,651 | 9/1996 | Radomski | 310/263 |
| 5,578,885 | 11/1996 | Alford et al. | 310/263 |
| 5,780,953 | 7/1998 | Umeda et al. | 310/263 |
| 5,804,897 | 9/1998 | Kuwahara | 310/77 |
| 5,892,313 | 4/1999 | Harris et al. | 310/263 |

FOREIGN PATENT DOCUMENTS 1209651 10/1972 Germany .

*Primary Examiner*—Nestor Ramirez
*Assistant Examiner*—Tran N Nguyen
*Attorney, Agent, or Firm*—Michael J. Striker

[57] ABSTRACT

The claw pole generator includes a drive shaft, two field spider halves (30.1, 30.2) mounted on the drive shaft, each of which include a disk-shaped plate (15) and claw-shaped magnetic pole elements (17) mounted on the disk-shaped plate (15), so that the magnetic pole elements (17) of each field spider half are engaged with each other, and a number of permanently magnetic pieces (27), each of which is arranged between adjacent magnetic pole elements (17). The disk-shaped plate (15) of at least one field spider half (13.1,13.2) is provided with a number of grooves (21), each of which extend in the plate (15) in a longitudinal direction of the drive shaft (5) and have an undercut (25). Each permanently magnetic piece (27) has a section which corresponds in shape to or which fits into one of the grooves (21), so that the permanently magnetic pieces (27) are insertable in respective grooves (21) and radially securable therein.

16 Claims, 9 Drawing Sheets

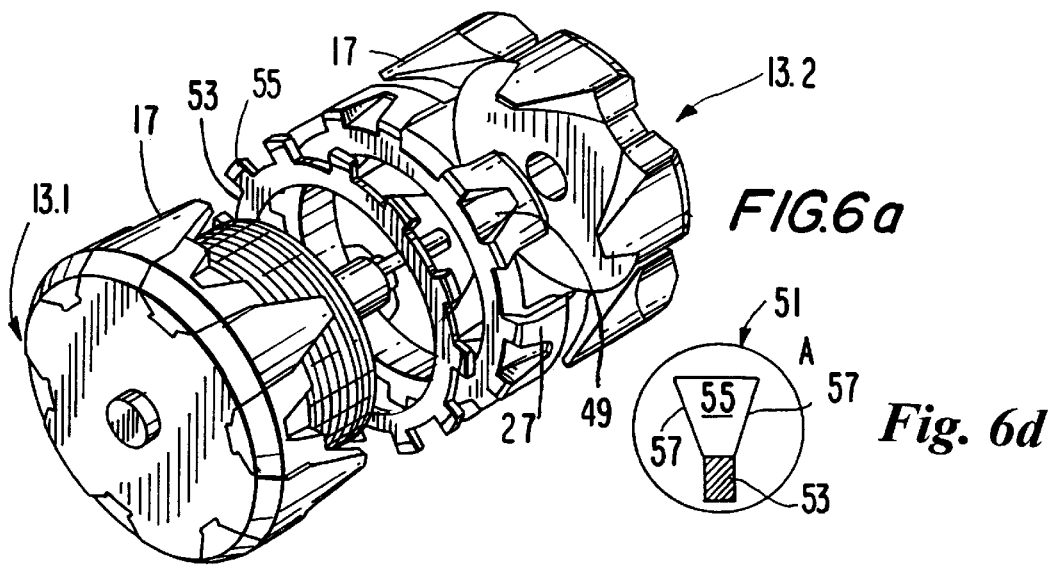
*FIG.6a*
*Fig. 6d*
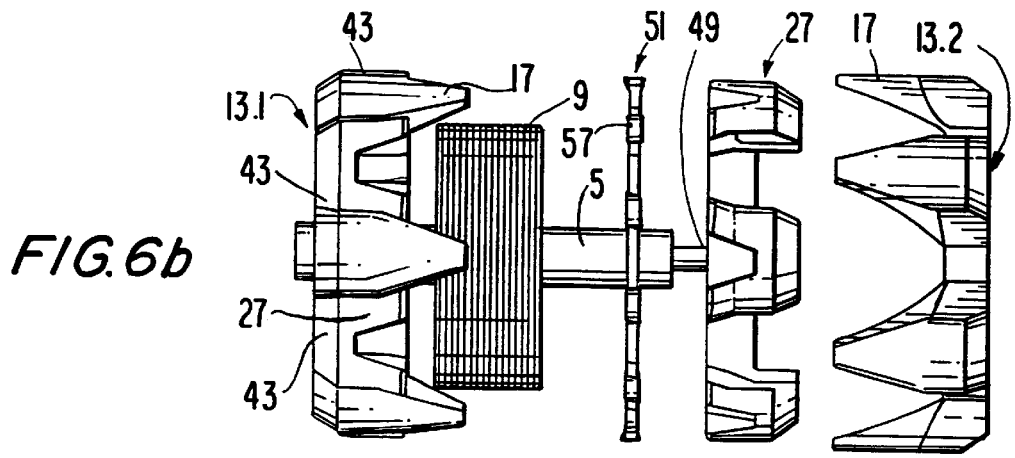
*FIG.6b*
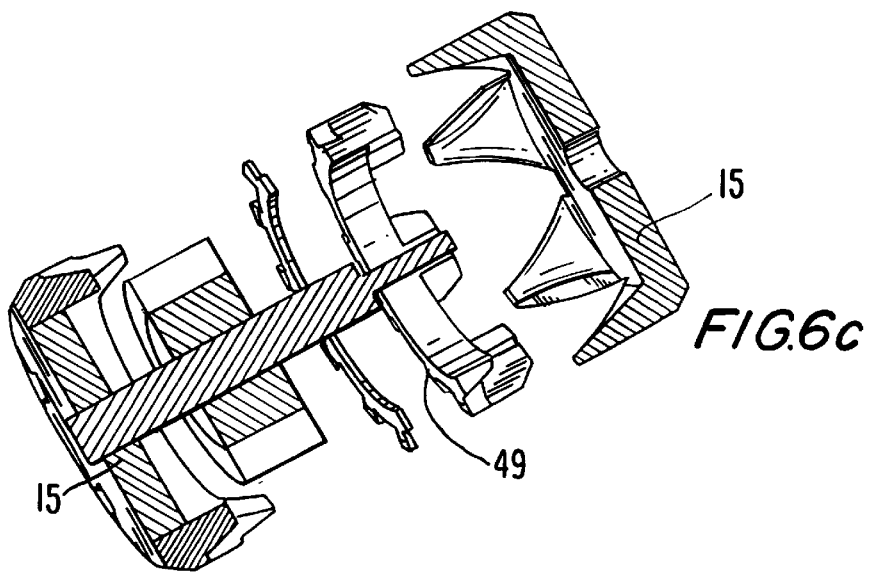
*FIG.6c*

CLAW POLE GENERATOR

BACKGROUND OF THE INVENTION

The present invention relates to a claw pole generator and, more particularly, to a claw pole generator with two field spider halves or magnetic wheel halves mounted on a drive shaft, which have claw-like magnetic pole elements mounted on a disk-like plate, in which the magnetic pole elements of both field spiders engage in each other and are provided with permanently magnetic pieces which are provided between adjacent magnetic pole elements.

The claw pole generators of the above-described type are generally known. U.S. Pat. No. 1,209,651 discloses a claw pole generator having a drive shaft on which an excitation coil is mounted. A field spider half is slid on the drive shaft next to a rotor core on each longitudinal side of the excitation coil. Each field spider half comprises a field spider disk, also known as a plate, from whose edge region claw-like magnetic pole elements extend in a longitudinal direction, also known as claws. Both field spider or magnet wheel halves are arranged so that the claws of a field spider halve engage in the space between the claws of the other filed spider half and enclose the excitation coil.

To obtain the largest possible power output or efficiency it is necessary to keep the stray magnetic flux occurring between the neighboring claws small or to eliminate it.

According to the above-named patent document permanent magnets are mounted between the neighboring claws, which oppose the magnetic stray flux and thus reduce it. At least one screw made of a nonmagnetic material penetrating the magnets must be used to secure the permanent magnets.

This type of attachment is however not suitable for series production.

SUMMARY OF THE INVENTION

It is an object of the present invention to provide an improved claw pole generator which does not suffer from the above-described disadvantage.

The claw pole generator according to the invention includes a drive shaft, two field spider halves mounted on the drive shaft, each of which includes a disk-shaped plate and a plurality of claw-shaped magnetic pole elements mounted on the disk-shaped plate so that the magnetic pole elements of each of the field spider halves are engaged with each other, and a plurality of magnetic pieces, each of which is arranged between adjacent magnetic pole elements. The disk-shaped plate of at least one field spider half is provided with a number of grooves, each of which extend in the plate in a longitudinal direction of the drive shaft and have an undercut, and each of the permanently magnetic pieces have a section or portion which corresponds in shape to or which fits into one of the grooves, so that the permanently magnetic pieces are inserted in respective grooves and radially secured therein.

The claw pole generator has the advantage that the permanent magnets, designated in the following as permanently magnetic pieces or PM pieces, are very easy to mount without auxiliary attachment means. However a secure support of the PM pieces is guaranteed by the large centrifugal force acting at the higher rotation speeds and also at high mechanical loads.

Because the grooves in the plate extending in a longitudinal direction of the drive shaft in at least one of the field spider halves are each provided with an undercut, the suitably formed PM pieces may be inserted in the longitudinal direction. The undercut provides for their radial bracing and support so that no additional attachment means, such as screws or the like, are necessary.

In manufacture of the generator the PM pieces need only be inserted from the side in the grooves without the need of any additional process or work steps for the purpose of attaching them.

The grooves can, for example, have a substantially circular cross-section or dovetailing shape. Understandably also all other forms, which have one or more undercuts, are also conceivable.

Arc segments made from a nonmagnetic material, which are inserted together with the PM pieces in the grooves, are advantageously provided to improve the radial support of the PM pieces inserted in the grooves. They each face the side of the PM piece facing away from the drive shaft and extend advantageously over the entire width of the plate.

The PM piece extends advantageously in a longitudinal direction up to the tip of the engaged claw, so that at least in the vicinity of the claw tip the stray field is counteracted.

In a particularly preferred embodiment the PM pieces are however each located in the entire region between two adjacent claws. Advantageously the PM piece extends up to a center of a claw in the longitudinal direction, so that the entire spaces between the adjacent claws are advantageously covered by the PM pieces of both field spider halves meeting with each other.

In a particularly preferred embodiment the PM pieces are each provided with a V-shaped recess closed to the drive shaft as seen in a plan view so that an end portion or section of a claw, which means the tip of a claw pole piece, can engage therein. The recess in the PM piece closed to the drive shaft provides a higher stability, whereby the base radially interior thereto should be spaced from the claw pole piece, in order to prevent bulging of the claw pole piece at high rotation speed and thus with large centrifugal forces.

To improve the ability of manipulate the apparatus advantageously the PM pieces of one field spider half are mounted in a ring (in the following designated as the "PM piece ring"), so that a plurality of individually inserted PM pieces are not present, but instead the PM pieces are engageable together as a single unit in the grooves. Furthermore the PM pieces can themselves be formed as a ring and/or combined into a ring.

When two such PM piece rings are used, so that a radial bulging or spreading of the inner edge region of the ring can be avoided, a toothed ring disk made from nonmagnetic material, whose teeth widen in an outward radial direction, is introduced between both PM piece rings. By providing the surfaces of the PM piece rings contacting on the teeth with a suitable form a bulging or widening radially toward the outside is not possible.

Advantageously in a particularly preferred embodiment the PM pieces associated with both field spider halves are provided in a common ring so that only one single component is manipulated. This leads to a simplification of the assembly of the generator.

In an especially advantageous embodiment a ring with PM pieces is made, wherein ring regions under the claims are open in the assembled state. The inertial mass of the PM piece rings may be clearly reduced without a noteworthy impairment of the stability, which improves the drive conditions for the generator.

Additional features of other embodiments of the invention are presented in the appended dependent claims and description hereinbelow.

BRIEF DESCRIPTION OF THE DRAWING

The objects, features and advantages of the invention will now be illustrated in more detail with the aid of the following description of the preferred embodiments, with reference to the accompanying figures in which:

FIGS. 6a to 6c are three different views of a pole piece according to a fourth embodiment of the invention, FIG. 6d is a detailed transverse cross-sectional view through a disk from the device shown in FIGS. 6a to 6c, FIGS. 7a to 7c are three different views of a pole piece according to a fifth embodiment of the invention.

DESCRIPTION OF THE PREFERRED EMBODIMENTS

Figure 1:
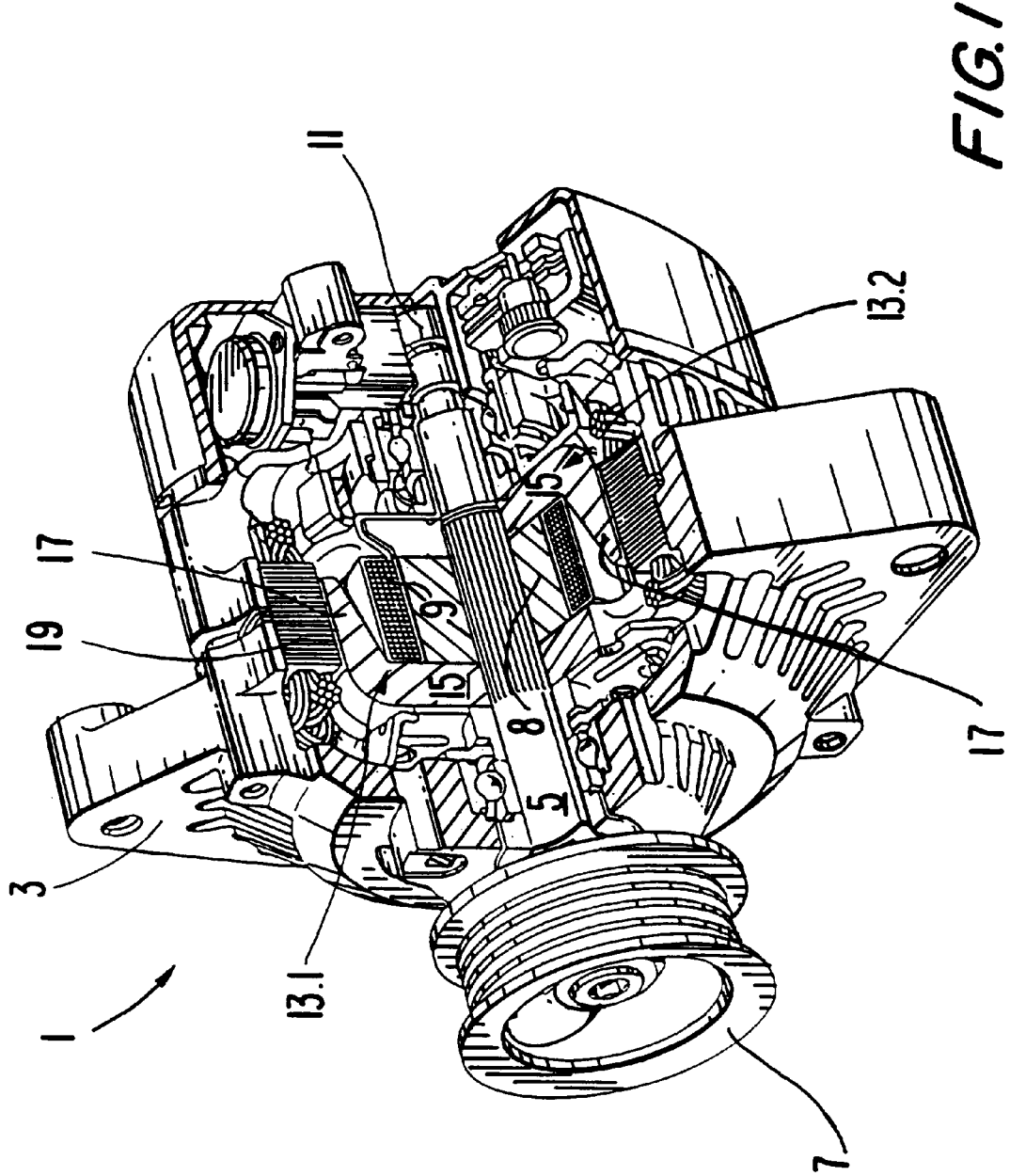
FIG. 1 is a cutaway perspective view of a claw pole generator.

For a better understanding of the invention the overall structure of a claw pole generator is shown in FIG. 1, in which however only the essential components or parts are shown.

The claw pole generator 1 has a housing 3, in which a drive shaft 5 is mounted. A drive belt disk 7 is attached to an end of the drive shaft 5 outside of the housing 3, by which the drive shaft 5 with a pole core 8, is driven, e.g. by a drive belt. An excitation coil 9 is rigidly mounted on the drive shaft 5 inside the housing and a comparatively small excitation current flows through the excitation coil 9 via the collector ring 11 mounted on the drive shaft. The excitation coil 9 is enclosed laterally by at least one of the field spider halves 13.1 and/or 13.2, which comprise respectively a field spider disk 15 extending perpendicularly to the drive shaft 5, also called in the following a plate, and claw-like magnetic pole elements 17 extending longitudinally to the drive shaft 5, in the following also called claws. Each of the field spider halves 13.1 or 13.2 has a plurality of these claws 17 spaced uniformly from each other in a circumferential direction, whose number depends on the application or purpose of the generator.

From FIG. 1 it is apparent that the claws of the opposing field spider halves 13.1 and 13.2 engage in each other so that north and south poles alternating in the circumferential direction around the field spider form with the excitation coil 9 excited.

A fixed stator 19 is arranged radially spaced from the claws 17 of the field spider halves 13, which for example have a three-phase stator winding. The stator 19 itself comprises sheet metal pieces provided with grooves, insulated from each other, which are pressed together in a fixed sheet packet. Coils of the stator winding are embedded in the grooves—as seen in FIG. 1.

A magnetic flux is set up in operation, which extends from the core of the excitation coil 9, the so-called pole core 8, through the plate 15 and the claws 17 of a field spider halve 13.1 to the stator 19 and from there into the neighboring claws of the other field spider half 13.2 and through the plate 15 to the pole core, whereby the magnetic circuit is again completed. A not insignificant stray flux occurs in the air gap between two neighboring claws in the conventional generators.

Permanent magnets which oppose the stray flux are mounted in this gap to avoid and/or reduce the stray flux.

The arrangement and attachment of these PM pieces is explained now with the reference to FIG. 2.

Figure 2A:
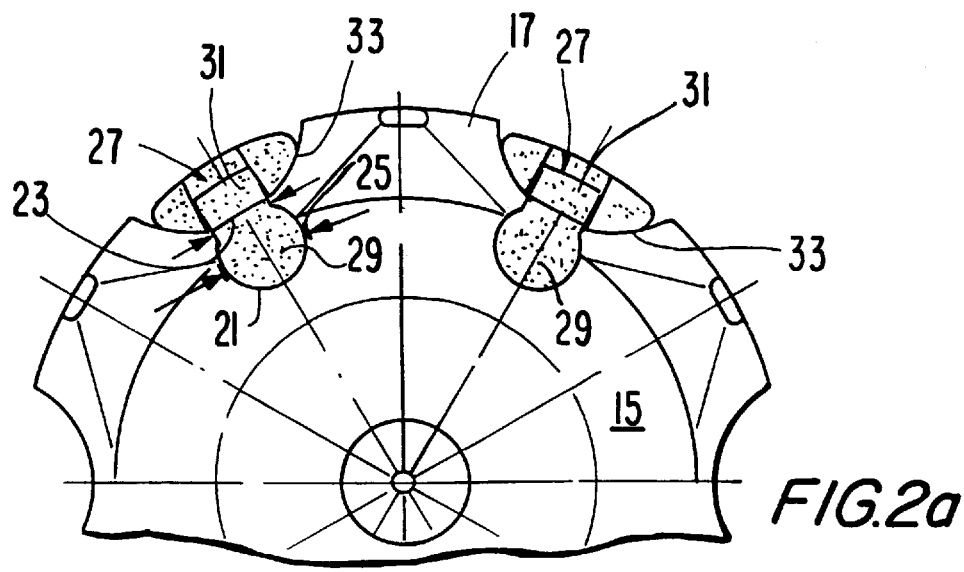
FIGS. 2a to 2c are schematic cross-sectional views through respective different embodiments of field spider halves having plates with different grooves.

Thus FIG. 2a shows a half of a plate 15 in plan view, from whose edge the claws 17 extend. Grooves 21 (pole gaps) are provided in the plate and extend radially between the claws 17. The groove 21 shown in FIG. 2a has a substantially circular cross-section, whereby the width B of the groove opening 23 is smaller than the width of a more interior region 25. This relationship between the width of an exterior groove section and an interior groove section is designated in the following as undercut.

With a circular cross-sectioned groove that means that the width B of the groove opening 23 is smaller than the diameter.

A PM piece 27 is slid in the groove 21 opening into the plate 15 at least on one longitudinal side. A section 29 of the PM piece 27 inside the plate is adjusted to the shape of the groove 21 so that it is secured radially because of the undercut. The undercut thus also serves to take large centrifugal forces caused by a high rotation speed.

FIG. 2a shows that the outer section or portion 31 of the PM piece is formed so that the surfaces 33 contact on the corresponding surfaces of the plate 15. The PM piece is thereby secured from rotating in the circular groove 21.

Figure 2B:
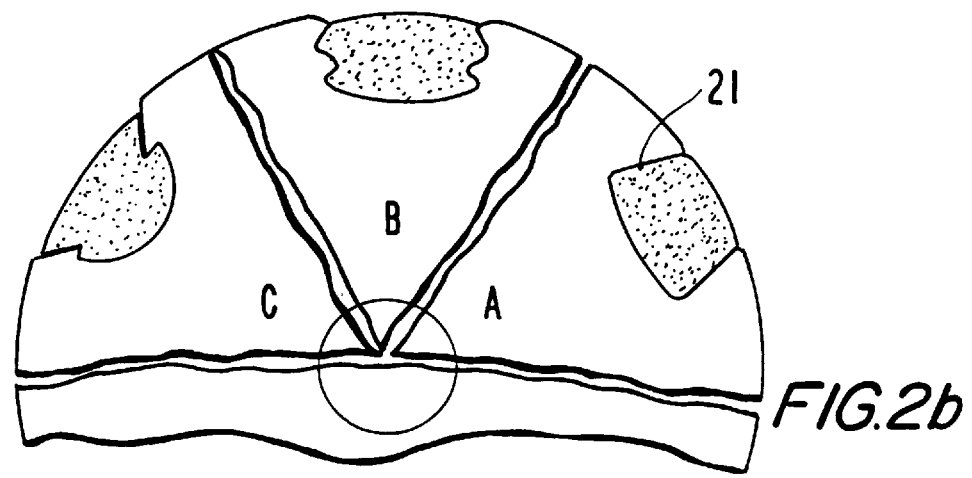

Several additional shapes of the grooves 21 are shown in FIG. 2b. Thus the groove 21 has a trapezoidal cross-section in the cutaway portion A. The side walls of the groove 21 are profiled in the portion B, whereby several undercuts are formed.

An additional embodiment is provided in cutaway section C of FIG. 2b. The cross-section of the groove has a dovetailing shape.

Understandably also other forms are possible according to the individual specifications regarding the mechanical loads. All these embodiments or forms however have an undercut in common which allows a radial fixing with suitable shapes for the PM pieces and is located in the plate between homopolar claws.

Figure 2C:
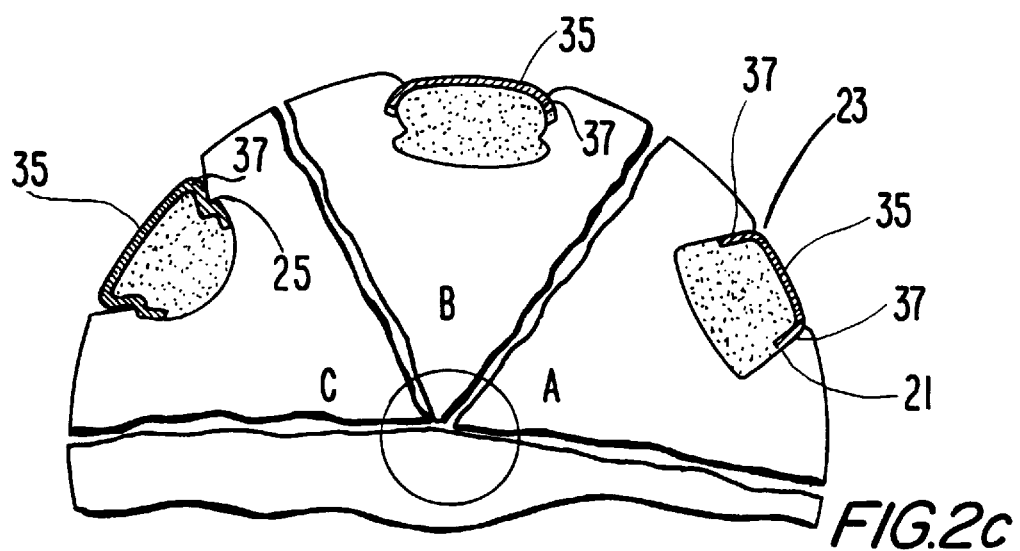

The mechanical stability and reliability of the PM piece may be further increased by insertion of an arc-shaped segment 35 made from ferromagnetic material, as shown in FIG. 2c. This arc-shaped segment 35 extends over the groove opening 23 and contacts with its edge regions 37 of the side walls of the groove 21. These edge regions 37 extend to the undercut until also they are radially fixed. The arc-shaped segments extend in a longitudinal direction over the entire width and/or thickness of the plate 15.

These arc-shaped segments 35 guarantee thus an additional securing with a suitable design in order to improve the stability of the PM piece at high rotation speed.

The edge regions 37 of these arc-shaped segments 35 are adjusted to fit the shape of the groove as seen clearly from the three sections A, B and C of FIG. 2c and must extend at least in the region of the first undercut 25, as seen from section C.

Figures 3A, 3B, 3C:
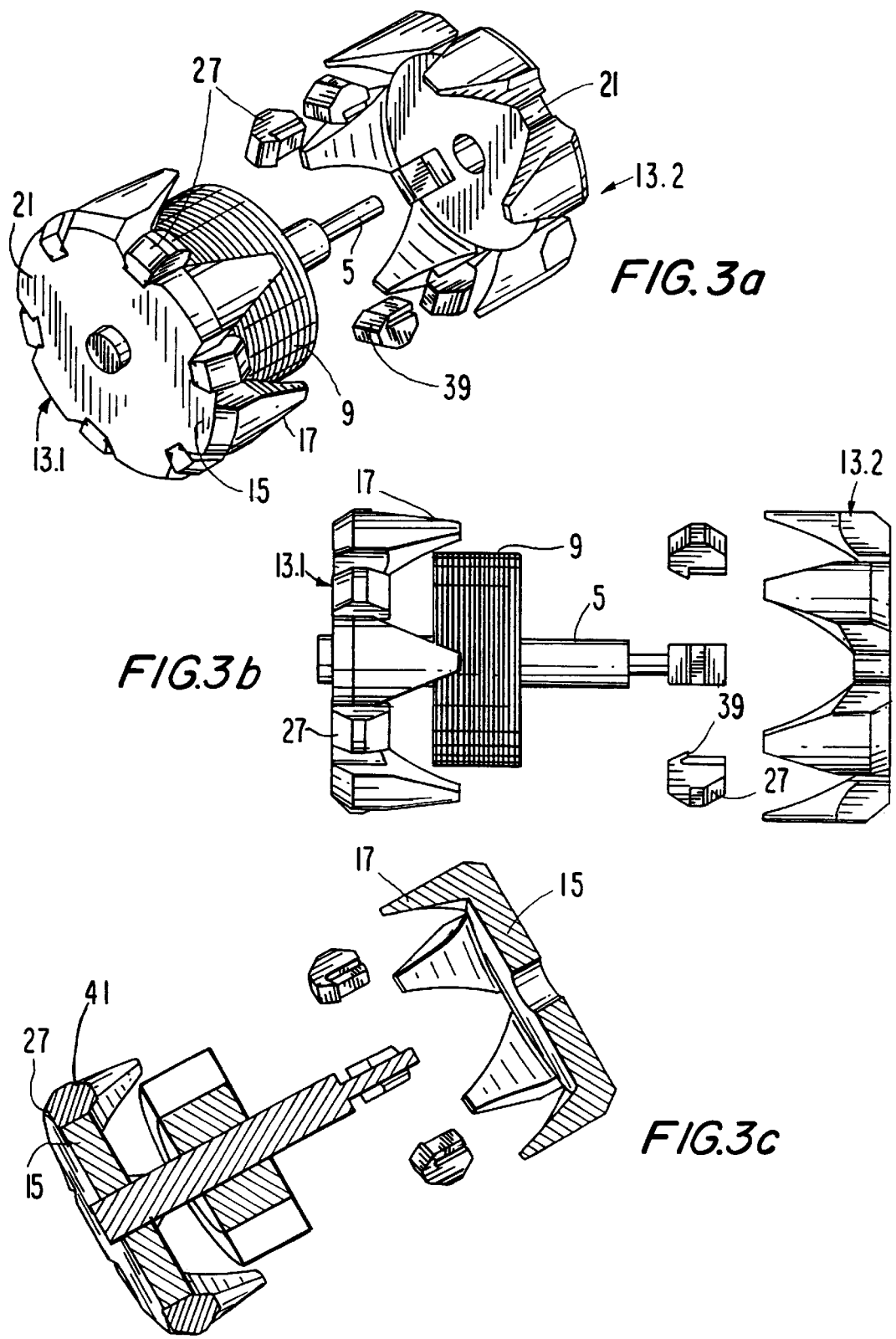
FIGS. 3a to 3c are three different views of a pole piece according to a first embodiment of the invention.

The rotor group structure of the generator shown in FIG. 1 is shown in FIG. 3 in three different perspective views and comprises both field spider halves 13.1 and 13.2, the excitation coil 9, the drive shaft 5 and the PM pieces 21 in an exploded perspective view.

As already mentioned, the trapezoidal grooves 21 in this embodiment are provided in the plate 15 in the region between the respective two claws. Also six PM pieces 27 are inserted in the field spider shown with six claws per field spider half. The PM pieces 27 are slid in from the side facing the excitation coil 9, i.e. the interior side, prior to the assembly of both field spider halves.

FIG. 3 shows that the PM pieces 27 have a stop 39 which limits the insertion depth into the groove 21. An exact positioning thus may be guaranteed.

Each PM piece 27 has a radially inclined surface 41, in the vicinity of which the tip of one of the claws 17 of the opposing field spider half 13 ends. The PM pieces 27 are thus reliably held in the longitudinal and radial direction in mounted field spider halves, without using screws or other attaching parts.

Figure 4A:
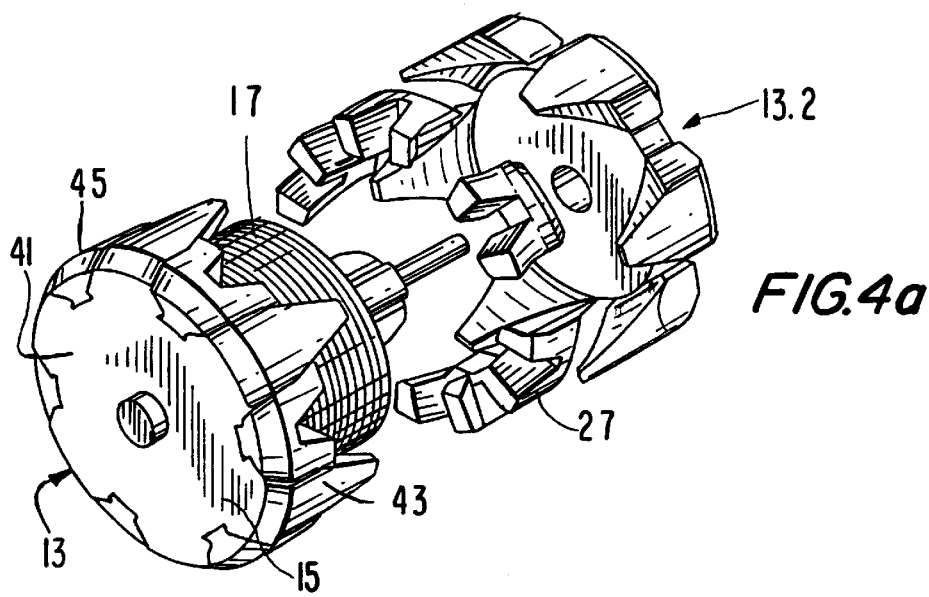
FIGS. 4a to 4c are three different views of a pole piece according to a second embodiment of the invention.
Figure 4B:
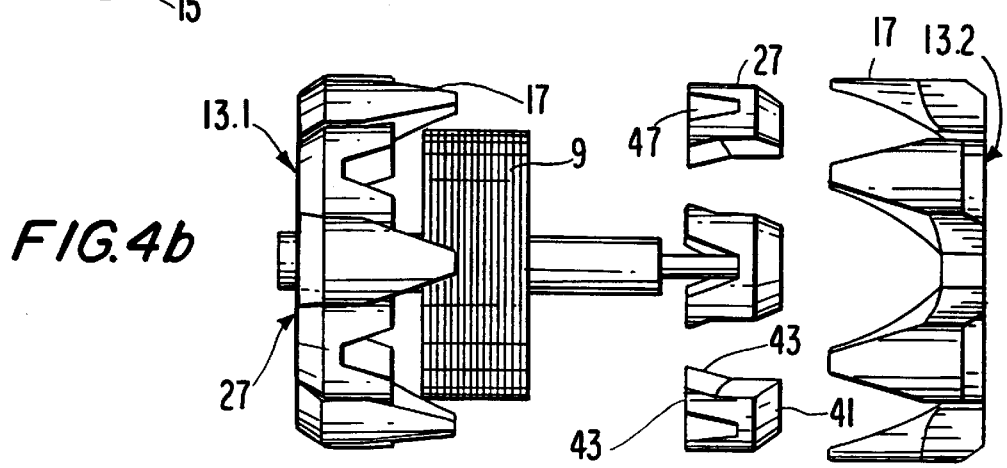
Figure 4C:
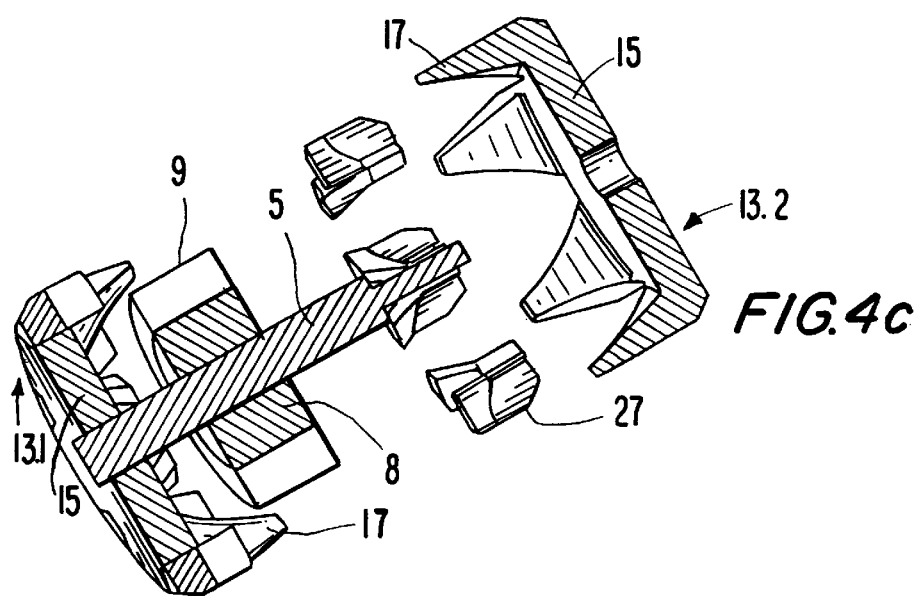

FIG. 4 shows another embodiment of the invention. The difference however is only in the form of the PM pieces 27, so that the description of the parts which have reference numbers which are the same as in the embodiment shown in FIG. 3 has been omitted.

In this embodiment the PM pieces 27 have a U- and/or V-shape with a base member 41 and two legs 43 extending from it.

The base member 41 has a section fitting in the groove, which is also trapezoidal in this embodiment. The section of the base member 41 outside of the groove completely fills the region between both claws 17, and its extent in the longitudinal direction corresponds approximately to the thickness of the plate 15. The form of the outwardly facing surface of the base member 41 is adjusted to the shape of the plate 15 and the claws 17, so that a uniform substantially smooth surface results. In the embodiment shown a chamfer 45 of the base member 41 provided in a transition region between the plate and the claw is continuous.

Both legs 43 contact tightly or closely on the respective adjacent claws 17 and extend in the longitudinal direction up to about the center of the claw 17. The gap between the two adjacent claws 17 is filled substantially completely by the leg of a second PM piece 27 in the assembled or mounted state.

The width of the leg 43 of a PM piece 27 is thus selected so that a recess 47 between them is suitable for receiving an end section of a claw 17, and in this embodiment is V-shaped.

The recess 47 narrows in a radial direction toward the interior in order to prevent the bending of the ends of the legs 43 radially outwardly at high rotation speed, which means under the influence of larger centrifugal forces. A suitable form for the lateral surfaces of the claw 17 provides radial support.

Figure 5A:
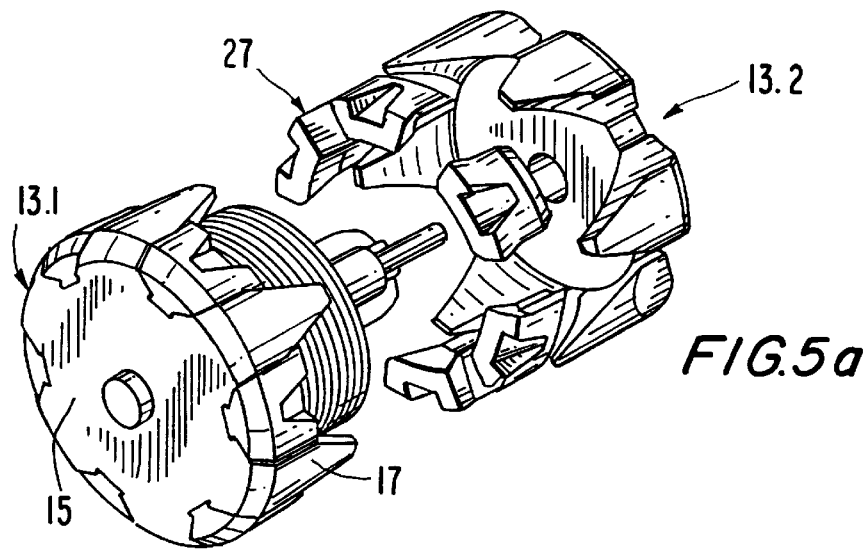
FIGS. 5a to 5c are three different views of a pole piece according to a third embodiment of the invention.
Figure 5B:
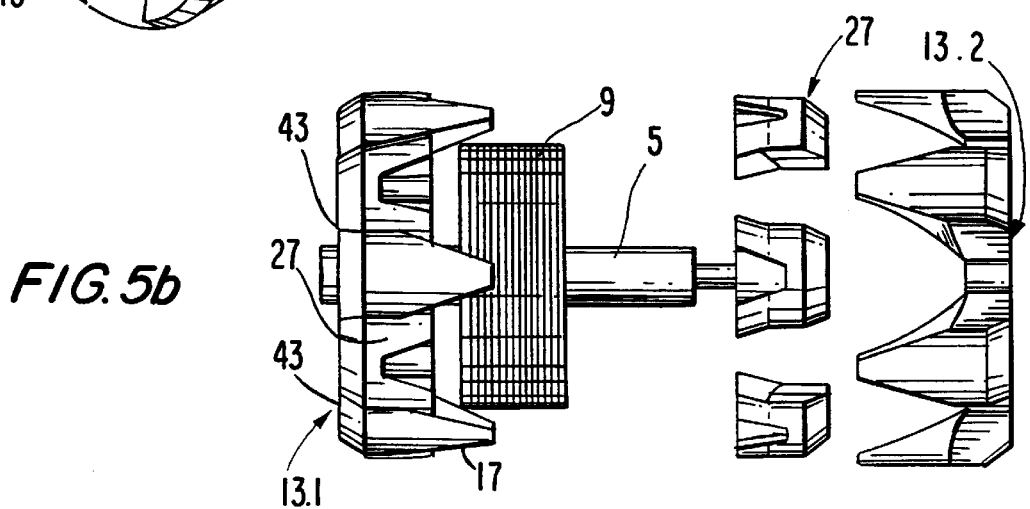
Figure 5C:
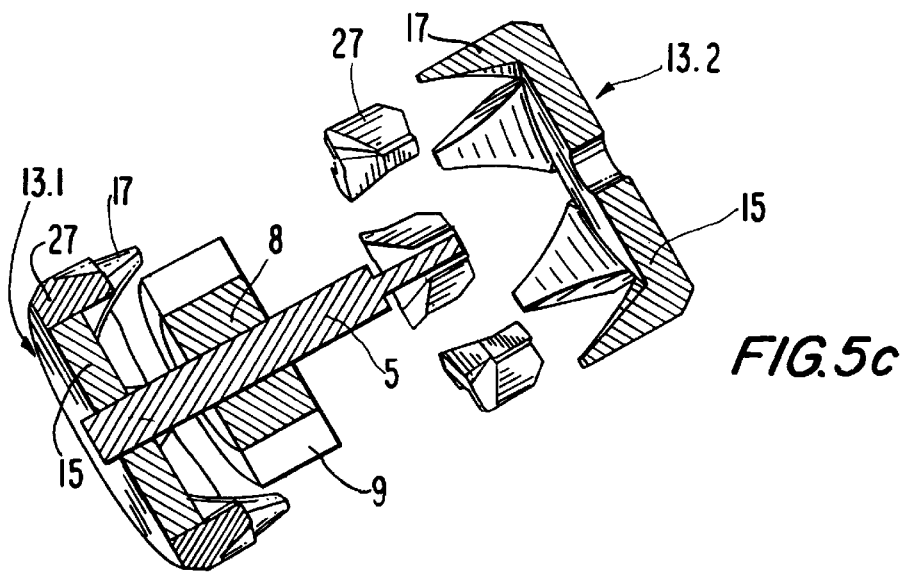

In FIG. 5 an additional embodiment of the invention is shown. This additional embodiment corresponds substantially to the previously described embodiment so that the description of the parts shown with the same references numbers is omitted here.

The difference here is that the legs 43 of a PM piece 27 are connected with each other on their radially interior ends. This connecting piece engages the end section of a claw 17 in the assembled state of the generator and provides thus additional stabilization.

An embodiment whose structure makes mounting of the PM pieces 27 easy is shown in FIG. 6. The PM pieces 27 already described in FIG. 5 are mounted on a ring 49. The PM pieces associated with the field spider halves 13.1 and 13.2 are manipulated or handled as a unit and thus can be very easily connected with or assembled together with the field spider halves. The diameter of the PM ring 49 is selected in the PM ring plugged into the field spider half so that the section extending between the PM pieces 27 engage the claws 17 of the respective field spider halves 13.1, 13.2.

In order however to prevent a radial bulging of the legs 43 in the inside vicinity of the PM piece 27 as seen in the longitudinal direction, a toothed disk 51 is provided made from a nonmagnetic material. This nonmagnetic material advantageously can be bronze, brass, V2A-steel, glass fiber-reinforced plastic or ceramic material. It comprises, as shown in FIG. 6a, a ring 53 and a number of teeth 55 extending radially to the outside. The number of the teeth 55 corresponds to the number of the gaps between the neighboring claws. This number also corresponds to the total number of PM pieces associated with the field spider halve.

The spacing of the teeth 55 from each other around the periphery corresponds to the spacing of the adjacent legs 43 of the PM piece 27, so that the opposing surfaces 5 of the teeth 55 engage or contact the ends of the legs 43.

In order to prevent a widening of the legs, the opposing surfaces 57 of each tooth 55 are conical, so that the spacing between both opposing surfaces 57 increases in a radial direction to the exterior. In FIG. 6d the shape of one tooth 55 is clearly shown. The disk 51 can take centrifugal forces when the surfaces of the legs 43 contacting on the opposing surfaces 57 are a suitable form.

Figure 7A:
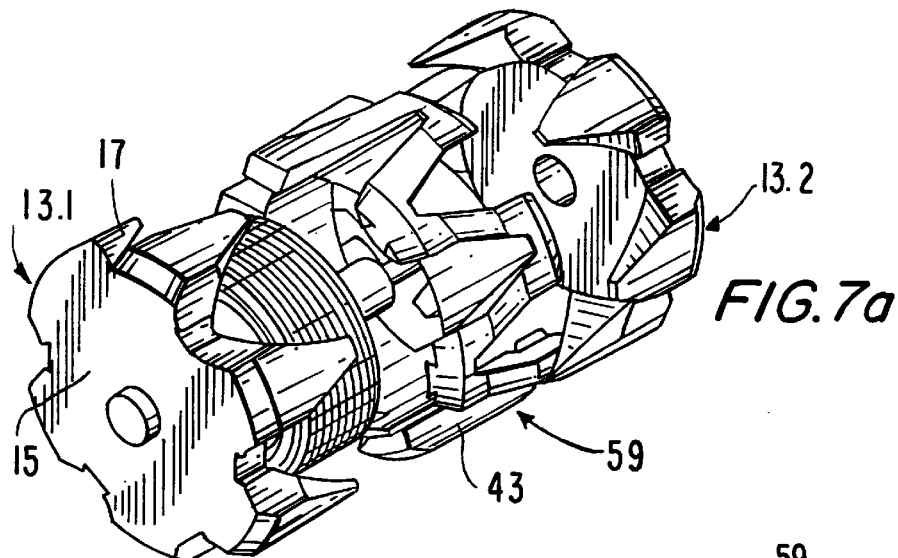
Figure 7B:
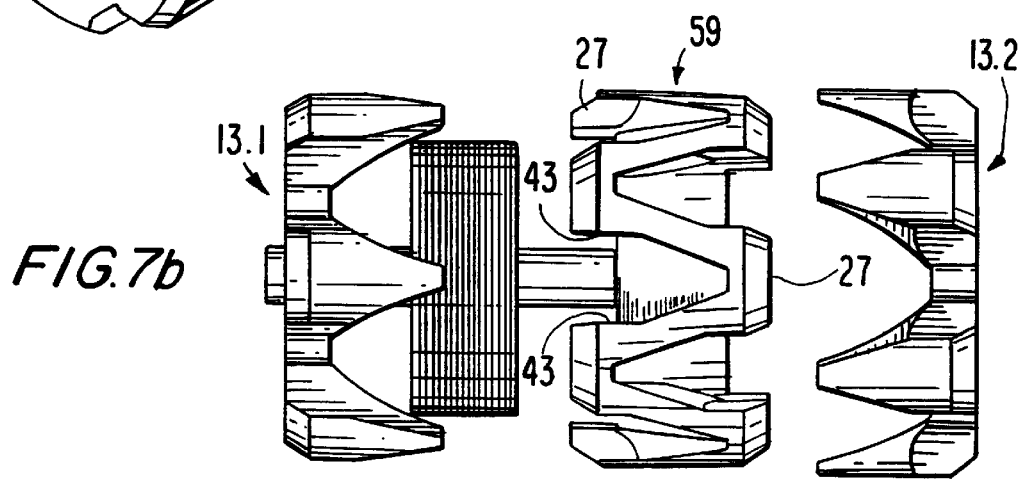
Figure 7C:
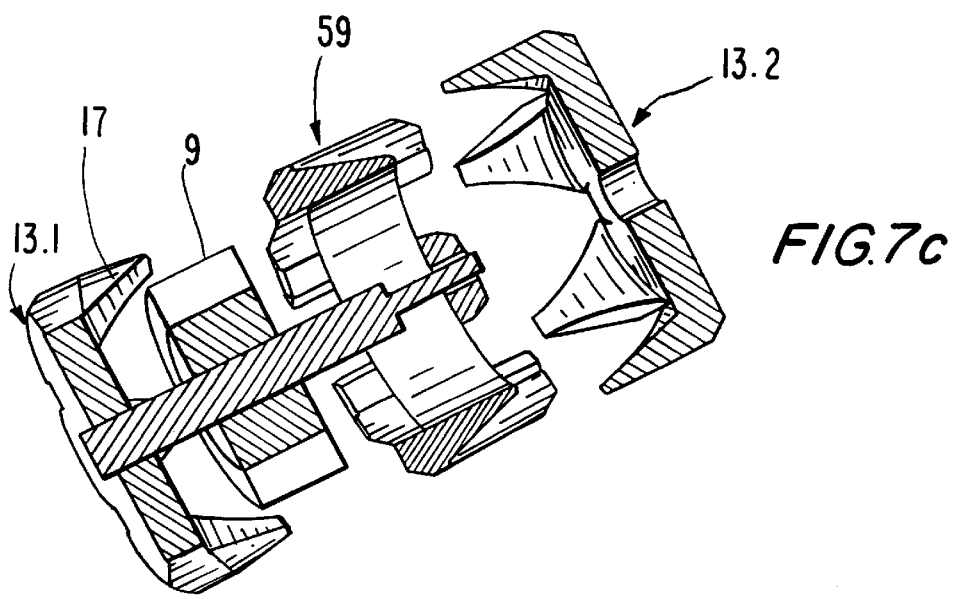

An additional embodiment of the invention is shown in FIG. 7. Both rings 49 having the PM pieces are combined into a single ring 59 in contrast to the previously described embodiments. The advantages obtainable thereby include a simplified assembly and easy handling. There is however no difference in operation so that description of parts having the same reference numbers as the previous embodiments is omitted here.

Figure 8A:
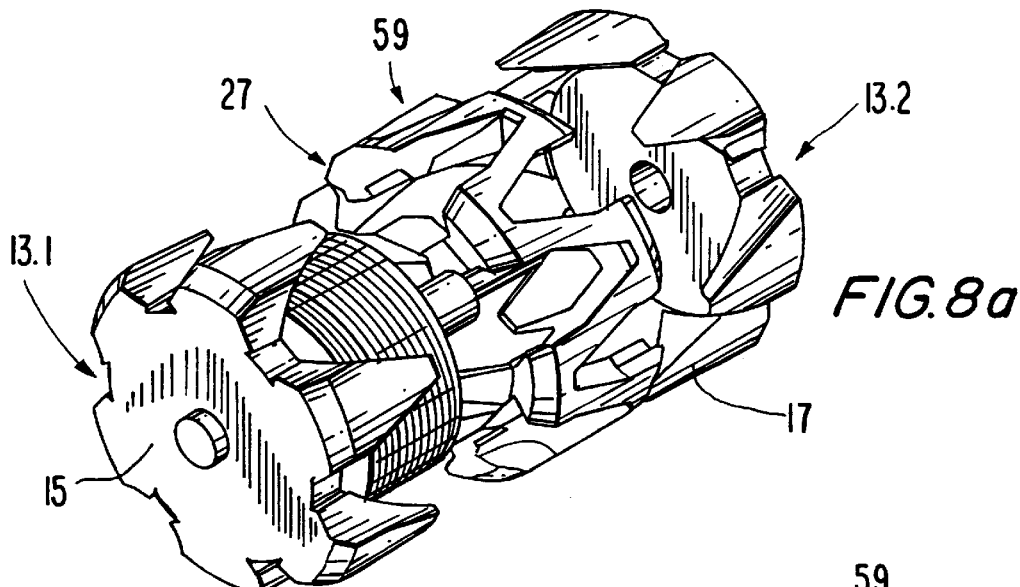
FIGS. 8a to 8c are three different views of a pole piece according to a sixth embodiment of the invention.
Figure 8B:
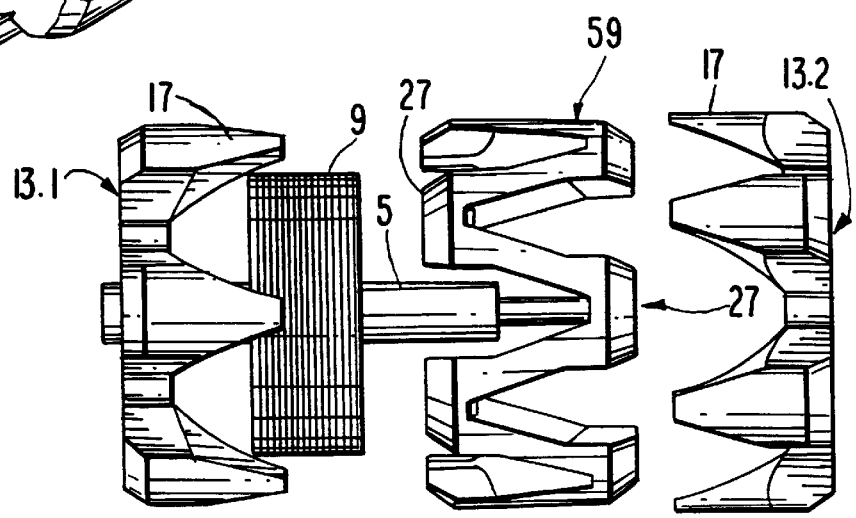
Figure 8C:
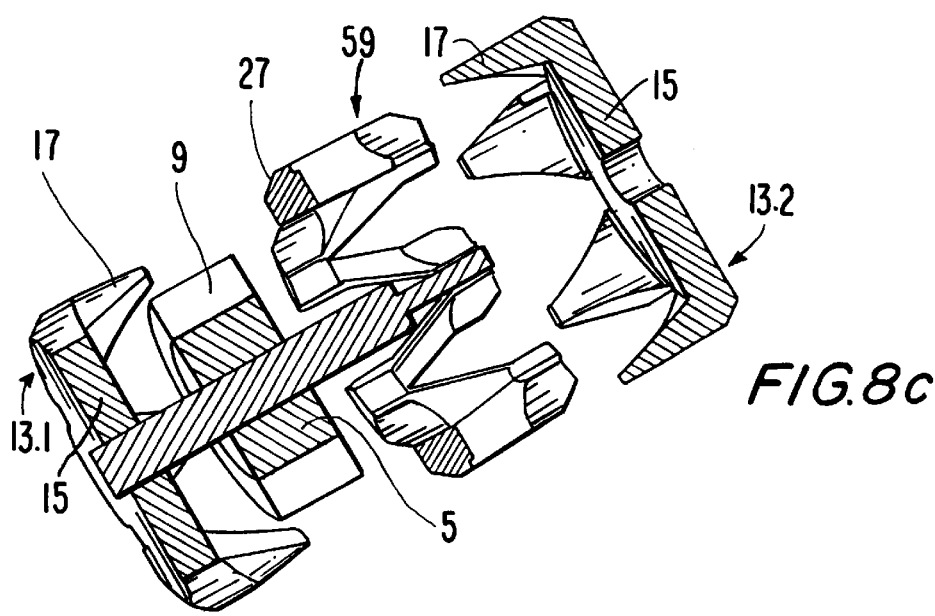

The connecting section between the legs 43 has been omitted in the embodiment shown in FIG. 8 in order to reduce the mass of this ring 59. The connection between PM pieces 27 opposite each other occurs thus only by the legs 43. As shown clearly in FIG. 8 the PM ring 59 has a zig-zag shape.

Understandably other forms of the PM ring 59 and/or the PM pieces 27 are conceivable. It is only critical that the PM pieces are insertable in the grooves and fixed radially and that a largest possible region of the air gap between the neighboring claws is filled so as to minimize the stray flux with the PM pieces.

The PM pieces in the inserted state in all embodiments are impregnated after magnetization by applying a magnetizing field, so that an additional increase in the mechanical strength results. Similarly a good connection with the PM pieces with the disk 51 may be attained by impregnation. In order to prevent the eventual loss of PM pieces in the air gap between the rotor and the stator, the PM pieces 27 can be provided with a thin thermally resistant plastic coating.

The above-described mounting of PM pieces according to the invention is understandably not only useful in a generator with a collector ring as in FIG. 1, but also with a collector ring-free generator. To follow a construction principle which utilizes as few wearing parts as possible, in order to obtain an extended lifetime free of maintenance, this type of generator has a fixed excitation coil sitting on an interior pole. A schematic cross-sectional view of this type of collector ring-free generator is provided in FIG. 9.

Figure 9:
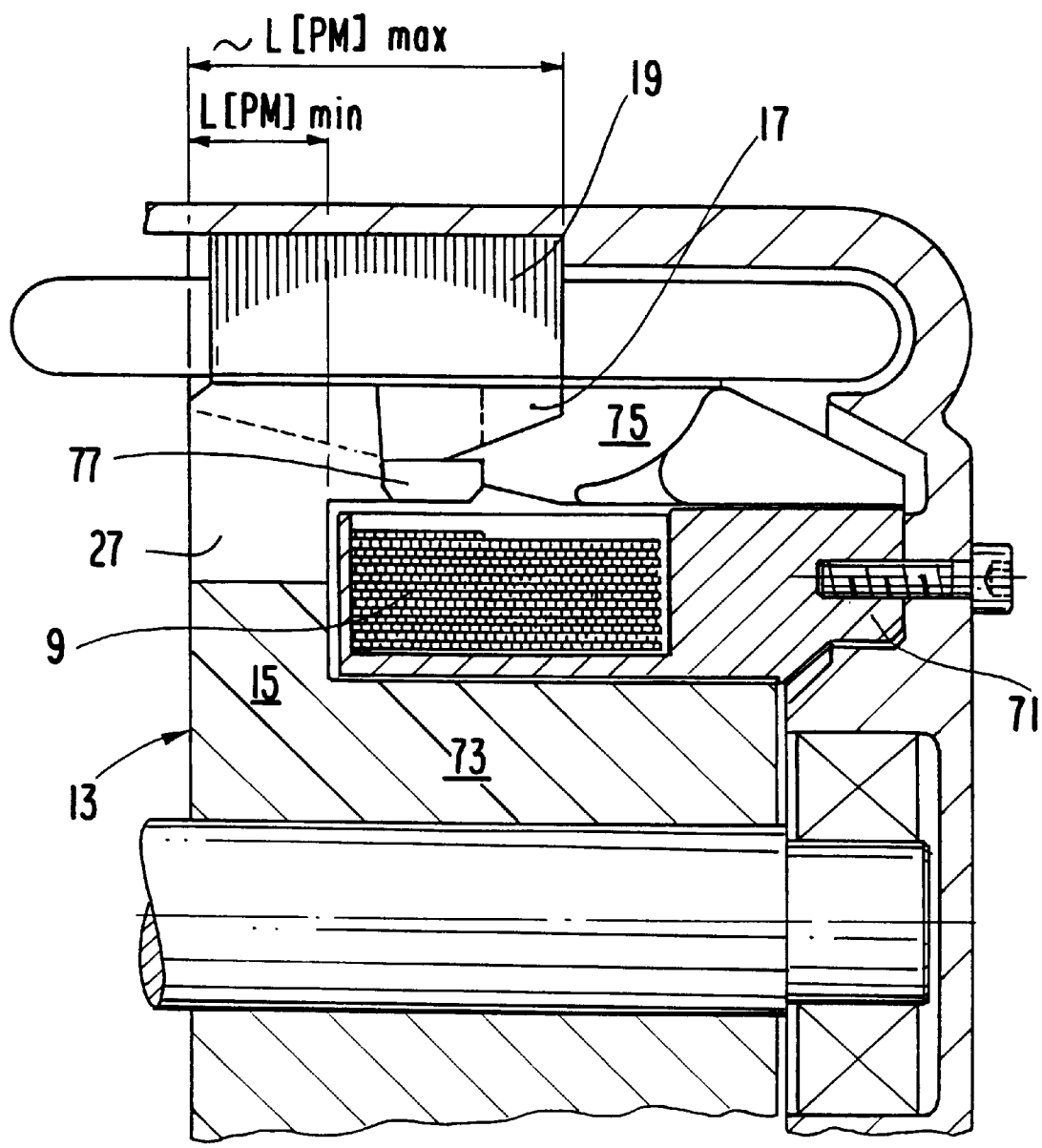
FIG. 9 is a schematic cross-sectional view through a collector ring-less generator.

The excitation coil 9 which is connected rigidly with the housing by a component 71 indicated as an inner pole is clearly seen in FIG. 9. The rotating field spider halves 13.1 and 13.2 have a longitudinal section 73, which is radially inside of the inner pole 71 and is designated or called a pole core. The claws 17 extend from the plates 15. The remaining parts which are the same as in FIG. 1 are indicated with the same reference numbers as in FIG. 1.

In contrast to the above-described generator type the collector ring-free generator has no second field spider half, which supports the other claws engaged in the intervening space. These claws 75 are mounted on the field spider half 13, with an unmagnetized retaining ring 77 taking charge of the connection. A detailed description of the detailed structure of these collector ring-free generators is not introduced here, because the details of these features are well known to one skilled in the arts.

FIG. 9 shows a PM piece 27 in the vicinity of the plate 15. This PM piece 27 should extend at least over a length $L(PM)_{min}$. The maximum length $L(PM)_{max}$ should however not exceed the longitudinal extent of the claws 17.

In dimensioning the PM pieces no overcompensation should occur in the stray flux regions of the claws. An excessive generator voltage would be produced with high rotation speed and reduced load, also when the excitation current was completely interrupted.

The attachment of the PM pieces 27 on the plate 15 may be performed as described in the above-described embodiments. The embodiments shown in FIGS. 3 to 6 may also be used as PM pieces 27.

An additional application of the attachment of PM pieces according to the invention occurs with twin collector ring-free generators. This includes two mirror-symmetrical collector ring-free generators, as described in FIG. 9. Both individual generators are arranged on a drive shaft so that the respective plates 15 are opposite each other. The PM pieces must be mounted on the drive shaft before the field spider halves are slid on the drive shaft.

When both field spider halves of the two individual generators are attached to the drive shaft in a press fit, the magnetization of the PM pieces is conducted on the already mounted rotor.

When only one field spider half is connected with the drive shaft by a press fit, the other field spider half is connected, for example, by a screw connection to the opposing field spider half. This has the advantage that a field spider half is slidable after loosening of the screws in order to subsequently already bring in the magnetized PM pieces.

An additional cooling effect may be obtained when for example every second PM pieces—in the circumferential direction—is reduced a few millimeters in a radial direction.

The disclosure in German Patent Application 196 42 784.3 of Oct. 17, 1996 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a claw pole generator, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

I claim:

1. A claw pole generator comprising a drive shaft, two field spider halves (13.1, 13.2) mounted on the drive shaft, each of which includes a disk-shaped plate (15) and a plurality of claw-shaped magnetic pole elements (17) mounted on the disk-shaped plate (15) so that the magnetic pole elements (17) of each of said field spider halves are engaged with each other, a plurality of permanent magnetic pieces (27), each of which is arranged between adjacent ones of the magnetic pole elements (17), wherein a plurality of grooves (21) are provided in the disk-shaped plate (15) of at least one of the two field spider halves (13.1, 13.2), each of said grooves (21) extending in said plate (15) in a longitudinal direction of the drive shaft (5) and having an undercut (25), and each of the permanently magnetic pieces (27) have a section which fits into one of the grooves (21) so that said permanently magnetic pieces (27) are inserted in respective ones of said grooves (21) and radially secured therein, and a toothed disk (51) having a plurality of radially extending teeth (55), each of said teeth (55) being arranged between adjacent magnetic pole elements (17) and braced on a respective one of said permanently magnetic pieces (27).

2. The claw pole generator as defined in claim 1, wherein said toothed disk (51) comprises a nonmagnetic material.

3. The claw pole generator as defined in claim 2, wherein said nonmagnetic material is selected from the group consisting of bronze, brass, V2A-steel, glass fiber-reinforced plastic and ceramic material.

4. The claw pole generator as defined in claim 1, wherein said permanently magnetic pieces (27) serving for stray flux compensation and said ring carrying said permanently magnetic pieces (27) are bonded to the toothed disk (51) by impregnation.

5. The claw pole generator as defined in claim 1, wherein each of said grooves has a circular cross-section.

6. The claw pole generator as defined in claim 1, wherein each of said grooves has a dovetail cross-section.

7. The claw pole generator as defined in claim 1, wherein the magnetic pole elements have conical lateral surfaces, and the permanently magnetic pieces (27) have side surfaces fitting the conical lateral surfaces of the magnetic pole elements so that centrifugal forces acting on the permanently magnetic pieces (27) are conducted to the magnetic pole elements with the help of the conical lateral surfaces.

8. The claw pole generator as defined in claim 1, wherein the permanently magnetic pieces (27) are coated with a thin thermally resistant plastic material.

9. A claw pole generator comprising a drive shaft, two field spider halves (13.1, 13.2) mounted on the drive shaft, each of which includes a disk-shaped plate (15) and a plurality of claw-shaped magnetic pole magnets (17) having identical polarities and extending under a sheet metal packet of a stater (19) and mounted on the disk-shaped plate (15) so that the magnetic pole elements (17) of each of said field spider halved are engaged with each other, a plurality of permanent magnetic pieces (27), each of which is arranged between adjacent ones of the magnetic pole elements (17), wherein a plurality of grooves (21) are provided in the disk-shaped plate (15) of at least one of the two field spider halves (13.1, 13.2), each of said grooves (21) being provided at both sides with undercuts (25) and extending in said plate (15) between identical magnetic pole elements (17) in a longitudinal direction of the drive shaft (5) and having an undercut (25), and each of the permanently magnetic pieces (27) at axially outwardly located end regions have a section which fits into one of the grooves (21) so that said permanently magnetic pieces (27) are inserted in respective ones of said grooves (21) and radially secured on said undercuts (25); an arc-shaped segment (35) consisting of a nonmagnetic material inserted in each of the grooves (21), and wherein said arch-shaped segments (35) are braced against said permanently magnetic pieces (27) in the grooves, said arch-shaped segments (35) being radially exterior to said permanently magnetic pieces (27) and said arch-shaped segments (35) extending over an entire thickness of the disk-shaped plate (15).

10. The claw pole generator as defined in claim 9, wherein each of said grooves have a circular cross-section.

11. The claw pole generator as defined in claim 9, wherein each of said grooves has a dovetailing cross-section.

12. The claw pole generator as defined in claim 9, wherein said grooves (21) are provided in both of said two field spider halves (13.1,13.2).

13. The claw pole generator as defined in claim 9, wherein each of said permanently magnetic pieces (27) has a V-shaped recess (47), each of the magnetic pole elements (17) has an end portion and said end portions engage in said V-shaped recesses of said permanently magnetic pieces, so that said end portion is spaced with surfaces of said end portion facing said drive shaft (5) from said one of said permanently magnetic pieces (27).

14. The claw pole generator as defined in claim 9, wherein the magnetic pole elements have conical lateral surfaces, and the permanently magnetic pieces (27) have side surfaces fitting the conical lateral surfaces of the magnetic pole elements so that centrifugal forces acting on the permanently magnetic pieces (27) are conducted to the magnetic pole elements with the help of the conical lateral surfaces.

15. The claw pole generator as defined in claim 9, wherein the permanently magnetic pieces (27) are coated with a thin thermally resistant plastic material.

16. The claw pole generator as defined in claim 9, wherein said grooves (21) are provided in both of said two field spider halves (113.1, 13.2).

* * * * *